Jan. 3, 1967 E. L. SHAW 3,296,385

SYNCHRONIZING SYSTEM UTILIZING CAPACITIVE COAXIAL
CABLE PICKUP FOR SUPPLYING CONTROL SIGNAL

Filed Oct. 5, 1964

INVENTOR.
ELTON L. SHAW

BY Lyon & Lyon

ATTORNEYS 3,296,385

SYNCHRONIZING SYSTEM UTILIZING CAPACITIVE COAXIAL CABLE PICKUP FOR SUPPLYING CONTROL SIGNAL

Elton L. Shaw, North Edwards, Calif., assignor of one-half to Richard A. Roosevelt Filed Oct. 5, 1964, Ser. No. 401,323
12 Claims. (Cl. 179—100.2)

This invention relates to a system for recording and reproducing a control signal on the recording medium of a recording and reproducing device and more particularly relates to a system for recording a control signal on one track of a multi-track recorder and using the reproduced control signal to synchronize the operation of the recorder with a controlled load, for example, a slide projector.

Various systems are presently commercially available for use in synchronizing the operation of a magnetic tape recorder with an automatic, electrically operated slide projector. The available systems utilize either a single track recorder in which control signals of a frequency higher than the frequency range of the narrative message on the tape is used, or a two-track recorder in which the control signals are recorded on one of the tape tracks and the narrative message is recorded on the other of the tape tracks. Each of the systems presently available, whether using a one-track or a two-track recorder, requires that a specially built recorder having internal circuitry for the production of the control signals be used, or else require that rather complicated auxiliary devices be used with a conventional recorder.

It is an object of the present invention to provide a system for recording control signals on a recording medium which is very simple and adaptable for use with presently available recording devices.

It is also an object of the present invention to provide a system for recording a control signal on one track of a two-track recorder at any desired time during the recording of a narrative message on the other track.

It is another object of the present invention to provide a system for recording control signals on one track of a two-track tape recorder and utilizing these signals to synchronize the operation of a slide projector with a narrative message recorded on the other track of the tape.

These and other objects and advantages of the present invention will become more apparent upon reference to the accompanying descriptions and drawings in which.

Figure 1:
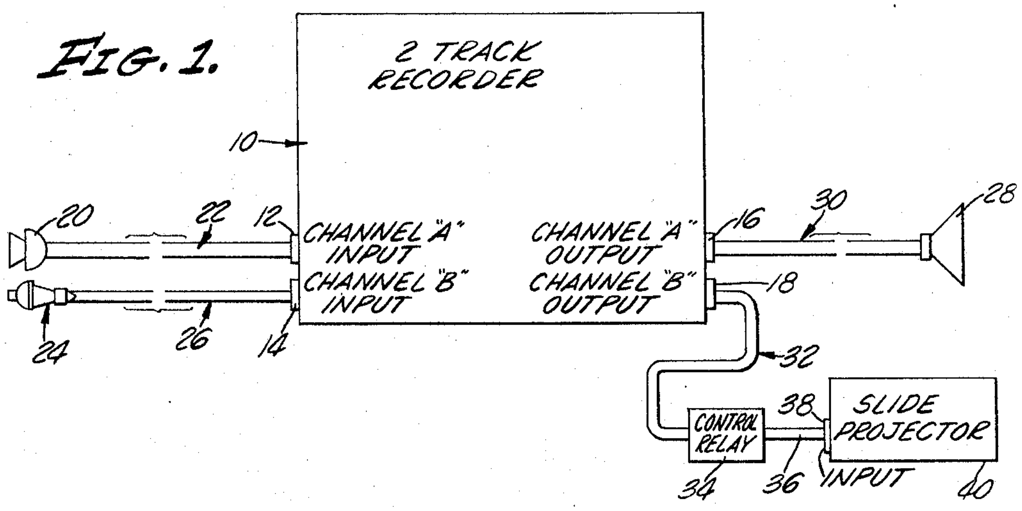
FIGURE 1 shows a block diagram of the system of the present invention.

Referring now to FIGURE 1, there is shown a conventional two-track or "stereo" recorder 10. This may be a recorder of any type but is preferably a two-track magnetic tape recorder having a first or channel "A" input 12 and a second or channel "B" input 14 and a first or channel "A" output 16 and a second or channel "B" output 18. A conventional microphone 20, or other desired input device, is electrically connected to the input 12 by means of a conventional coaxial cable 22. A push button device 24, the details of which are shown in FIGURE 2, is connected by a cable 26 to the second input 14.

A loud speaker 28 is connected by a cable 30 to the first output 16 of the recorder 10. This speaker could, of course, be an integral part of the recorder. The second output 18 of the recorder 10 is coupled by a cable 32 to a control relay 34, the details of which are shown in FIGURE 3. The output of the control relay 34 is connected by a cable 36 to the input 38 of a slide projector 40. The slide projector 40 is of the conventional automatic, electrically operated type that will cause a slide to be changed upon the receipt of an input signal.

As can be seen, the microphone 20 is used to record a narrative message, music, or both on one track of a two-track tape while the speaker 28 is used to reproduce the message so recorded. The push button device 24 is used to record control signals on the other track of the tape while the control relay 34 responds to this signal when the recorder is set for play-back to control the operation of the slide projector 40.

Figures 2, 3:
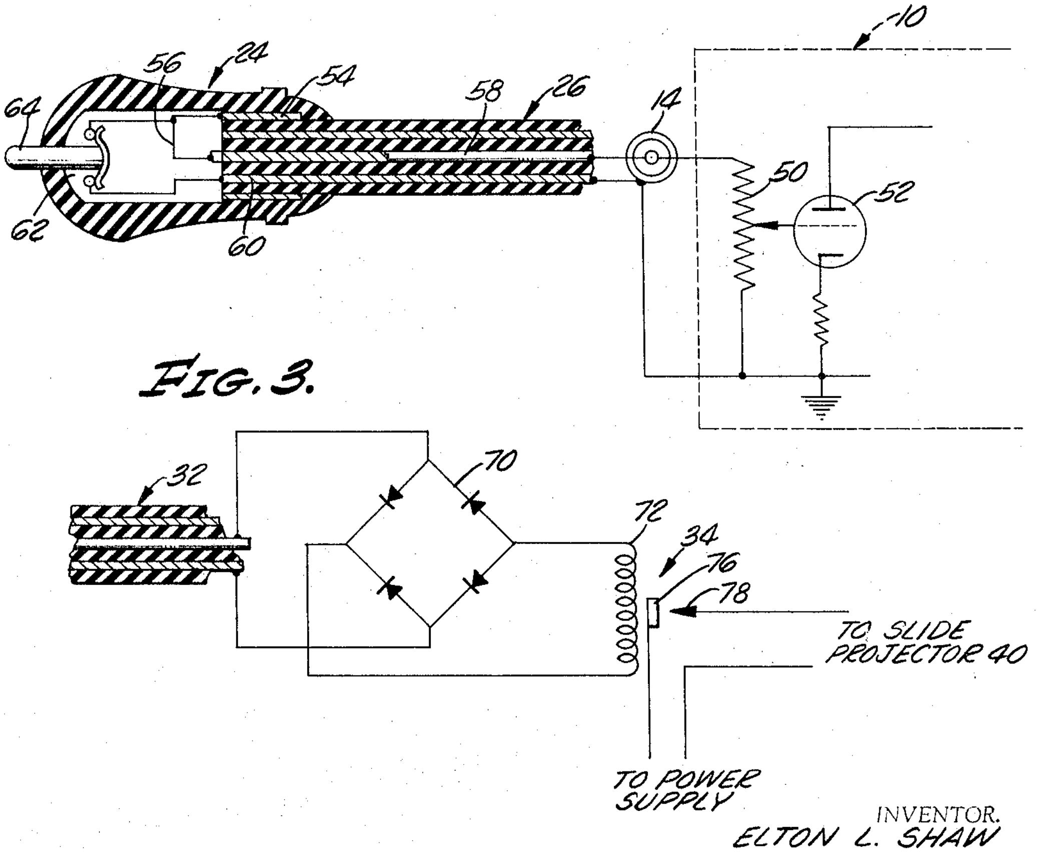
FIGURE 2 shows a schematic diagram of the recording portion of the system of the present invention.
FIGURE 3 shows a schematic diagram of the control portion of the system of the present invention.

Turning now to FIGURE 2, the portion of the system of the present invention used to record control signals is illustrated. As can be seen, the recorder 10 has the conventional coaxial jack 14 which is adapted to connect the outer conductor of a coaxial cable to ground and the inner conductor of the cable to a potentiometer 50, the wiper of whch serves to feed an input to an amplifier 52.

According to the present invention, one end of the coaxial cable 26 terminates in a conventional coaxial plug adapted to be plugged into the jack 14 and the other end terminates in a push button device 24. Within the push button device 24, there is provided a metal plate or sleeve 54 which preferably telescopes over the end of the coaxial cable 26. This sleeve 54 is conductively coupled by a conductor 56 to the center conductor 58 of the table. The center conductor 58 is also conductively connected to the outer conductor 60 by means of a normally closed switch 62. This switch is operated by the push button 64.

The operation of this portion of the system is as follows: When it is desired to record a control signal on the appropriate track of the tape, the push button 64 is depressed to momentarily open the switch 62. The opening of the switch 62 causes the inner conductor 58 of the cable to be capacitively coupled to ground by means of the outer conductor 60. The capacitive coupling is increased by means of the sleeve 54. In some cases, the sleeve 54 may not be necessary or may take other forms. This capacitive coupling will cause a momentary high level signal of approximately 60 cycles per second frequency to be introduced into the recorder input 14 and recorded on the appropriate track of the tape as such. This same signal will, of course, appear at the corresponding output when the tape is played back.

This played back signal is utilized by the circuit of FIGURE 3 to control the slide projector 40. The two conductors of the coaxial cable 32 are coupled to a full wave rectifier 70 which rectifies the alternating current signal and supplies it to the coil 72 of a relay 34. Energization of the coil 72 causes contacts 76 and 78 to be engaged with the result that a pulse of current from a power supply is provided to the input of the slide projector 40 causing it to change slides. Since the output of the recorder is fed directly to the control device, the output level control of the recorder can be used to control the sensitivity of the control device and therefore the need for a separate circuit in the control device is eliminated. The direct current relay is preferable because of its low pull-in voltage and current requirements. If desired, an A.C. relay could be used. In some situations it may not be necessary to use any relay, in which case the output signal would be fed directly to the load.

From the foregoing description, it can be seen that a very simple system has been provided for recording control signals on one track of a recording medium and utilizing these signals so recorded to control the operation of a load. The system is particularly useful for synchronizing a slide projector with a narrative or other message recorded on another track of the recording medium. The system requires no alteration of existing equipment and is simple and fool-proof in operation. The system could, of course, be built into a recorder if such was desired.

The invention may be embodied in other specific forms not departing from the spirit or central characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A circuit for recording a control signal on a recording medium of recording and reproducing apparatus having a two terminal input one of said input terminals being connected to circuit ground, comprising a pair of electrical conductors having means at one end thereof for connecting said conductors to said terminals and a normally closed switch at the other end thereof, said switch when closed causing said two conductors to be conductively coupled and when open causing said conductors to be capacitively coupled.

2. A circuit for recording a control signal on a recording medium of recording and reproducing apparatus having a coaxial input jack, comprising a two conductor coaxial cable having a plug at one end thereof for insertion into said jack and a normally closed switch at the other end of said cable, said switch when closed causing the two conductors of said cable to be conductively coupled and when open causing said conductors to be capacitively coupled.

3. A circuit for recording a control signal on a recording medium of recording and reproducing apparatus having a coaxial input jack, comprising a two conductor coaxial cable having a plug at one end thereof for insertion into said jack, a normally closed switch at the other end of said cable, said switch when closed causing the two conductors of said cable to be conductively coupled and when open causing said conductors to be capacitively coupled and a metal plate conductively coupled to the internal conductor of said cable to increase the capacitive coupling when said switch is opened.

4. A circuit for recording a control signal on one track of a multi-track recording and reproducing apparatus while recording a message on another track, said apparatus having a coaxial input jack for controlling the recording and reproducing device associated with said one track, comprising a two conductor coaxial cable having a plug at one end thereof for insertion into said jack, and a normally closed switch at the other end of said cable, said switch when closed conductively coupling the two conductors of said cable whereby no input signal is presented to said device, said switch when open causing said conductors to be capacitively coupled whereby a power frequency input signal is presented to said device.

5. A circuit for recording a control signal on one track of a multi-track recording and reproducing apparatus while recording a message on another track, said apparatus having a coaxial input jack for controlling the recording and reproducing device associated with said one track, comprising a two conductor coaxial cable having a plug at one end thereof for insertion into said jack, a normally closed switch at the other end of said cable, said switch when closed conductively coupling the two conductors of said cable whereby no input signal is presented to said device, said switch when open causing said conductors to be capacitively coupled whereby a power frequency input signal is presented to said device, and a metal plate conductively coupled to the internal conductor of said cable to increase the capacitive coupling when said switch is opened.

6. The circuit of claim 5 wherein said plate is a sleeve positioned around said other end of said cable.

7. A system for controlling the operation of a load device by signals recorded on the recording medium of recording and reproducing apparatus having coaxial input and output jacks, comprising a two conductor first coaxial cable having a plug at one end thereof for insertion into said input jack, a normally closed switch at the other end of said first cable, said switch when closed causing the two conductors of said cable to be conductively coupled and when open causing said conductors to be capacitively coupled, whereby a power frequency signal is recorded on said recording medium, a second coaxial cable having a plug at one end thereof for insertion into said output jack, and means connected to the other end of said second cable and responsive to a reproduction of said signal for controlling said load device.

8. A system for synchronizing the operation of a load device with a message recorded on one track of a multi-track recorder having an input and an output coaxial jack for each track comprising means connected to the input jack corresponding to said one track for introducing said message into said recorder whereby it may be recorded on said one track, means connected to the output jack corresponding to said one track for reproducing the message recorded on said one track, a two conductor coaxial cable having a plug at one end thereof for insertion into a second input jack corresponding to another of said tracks, a normally closed switch at the other end of said cable, said switch when closed conductively coupling the two conductors of said cable whereby no input signal is introduced into said recorder at said second input jack, said switch when open causing said conductors to be capacitively coupled whereby a power frequency input signal is introduced at said second input jack, a load device, and means connected to the output jack corresponding to said second track and responsive to a reproduction of said input signal for controlling said load device.

9. The system of claim 8 wherein a metal plate is conductively coupled to the internal conductor of said said cable to increase the capacitive coupling when said switch is opened.

10. The system of claim 8 wherein said load device is a slide projector.

11. A circuit for recording a control signal on one track of a multi-track recording and reproducing apparatus while recording a message on another track, said apparatus having a coaxial input jack for controlling the recording and reproducing device associated with said one track, comprising a coaxial cable independent from and external of said apparatus, said cable having a plug at one end thereof for insertion into said jack, and switch means connected to the other end of said cable, said switch means normally being in a first condition whereby no input signal is presented to said device, and being operable to a second condition to present a power frequency input signal to said device.

12. A system for synchronizing the operation of a slide projector with a message recorded on one track of a multi-track recorder having an input and an output for each track, the input and output for at least one of said tracks being provided with a coaxial jack for electrical connection with external apparatus, comprising means connected to the input of the other of said tracks for introducing said message into said recorder whereby it is recorded on said other track; means connected to the output of said other track for reproducing the message recorded on said other track; a coaxial cable independent from and external of said recorder, said cable having a plug at one end thereof for insertion into said input jack;

switch means connected to the other end of said cable, said switch means normally being in a first condition whereby no input signal is introduced into said recorder or recorded on said one track, and being operable to a second condition to introduce at said input jack a power frequency input signal whereby it is recorded on said one track, the duration of said power frequency input signal being determined by the time said switch means is maintained in said second condition; and relay means for coupling said output jack to said slide projector, said relay means being responsive to a reproduction of said power frequency input signal to control said slide projector.

References Cited by the Examiner

UNITED STATES PATENTS

| | | | |
|---|---|---|---|
| 2,975,672 | 3/1961 | Shields | 88—28 |
| 3,110,216 | 11/1963 | Chalfin | 88—28 |

BERNARD KONICK, *Primary Examiner.*

IRVING L. SRAGOW, R. J. GARBACIK, L. G. KURLAND, *Assistant Examiners.*